United States Patent Office 2,892,000
Patented June 23, 1959

2,892,000

MANUFACTURE OF VINYL FLUORIDE AND 1,1-DIFLUOROETHANE

Benjamin F. Skiles, Wilmington, Del., assignor to E. I. du Pont de Nemours and Company, Wilmington, Del., a corporation of Delaware No Drawing. Application February 15, 1957
Serial No. 640,321

15 Claims. (Cl. 260—653.4)

This invention relates to a process for the preparation of vinyl fluoride and 1,1-difluoroethane. In particular, this process is concerned with the preparation of a mixture of vinyl fluoride and 1,1-difluoroethane by conducting a gaseous mixture of HF and acetylene over a chromium catalyst.

Vinyl fluoride is a valuable compound particularly for the preparation of polymeric plastic materials and the like. 1,1-difluoroethane is valuable as a refrigerant, as a propellent for producing aerosols, and for other purposes. It is known to prepare vinyl fluoride and 1,1-difluoroethane by reacting acetylene and hydrogen fluoride in the presence of mercury compounds as catalysts. Such mercury catalysts are expensive and relatively difficult to prepare, give poor yields of products, often exhibit long induction periods before the reaction begins, and tend to lose mercury whereby they tend to be unstable and have short catalyst lives.

It is an object of this invention to provide an improved process for the manufacture of vinyl fluoride and 1,1-difluoroethane. It is a further object to provide catalysts for this process which are easy and much less costly to prepare. Still another object is to provide a process which permits the relative yields of vinyl fluoride and 1,1-difluoroethane to be varied during the manufacture so that either product may be obtained in a preponderant amount. Other objects are to provide a new and improved process and to advance the art. Still other objects will appear hereinafter.

The above and other objects may be accomplished in accord with this invention which comprises passing a gaseous mixture of HF and acetylene, containing from about 1 to about 5 moles of HF to each mole of acetylene, over a catalyst consisting essentially of at least one member of the group consisting of a chromium oxide and a chromium salt of an acid maintained at a temperature of from about 200° C. to about 400° C., the gaseous mixture being passed over the catalyst at a rate of from about 20 volumes to about 200 volumes of acetylene per volume of catalyst per hour, and recovering at least one of vinyl fluoride and 1,1-difluoroethane from the reaction mixture.

By such process, vinyl fluoride and 1,1-difluoroethane are efficiently produced, high conversions and yields being obtained by recovering and recycling unreacted HF and acetylene from the reaction mixture. Either vinyl fluoride or 1,1-difluoroethane may be obtained as the predominant product by controlling the velocity of the gaseous mixture and the temperature, and by recycling the less desired product, all as explained hereinafter. The catalysts are easy to prepare and are far less costly than the previously known mercury catalysts, resulting in material economies and reductions in the costs of the products. While Coffman and Cramer, in U.S. Patent No. 2,461,523, patented February 11, 1949, disclose that a catalyst prepared by heating chromium trifluoride hydrate is effective to catalyze the dehydrofluorination of 1,1-difluoroethane, it was not known or obvious that such catalyst would be effective for the reverse reaction, i.e. the addition of HF to acetylene and to vinyl fluoride. In addition, when the catalysts of this invention have become exhausted or substantially so, they may be treated to form effective catalysts for the dehydrofluorination of 1,1-difluoroethane and similar polyfluoroalkanes as in the process of Coffman and Cramer.

The process of this invention is carried out in a relatively simple manner. The catalyst is introduced into a metal reaction tube in the form of fine particles or pellets, or the catalyst may be placed on an inert support. After the bed of catalyst is heated to a temperature of from about 200° C. to 400° C., a gaseous mixture of HF and acetylene is passed through it. The gaseous mixture of HF and acetylene should contain the HF in a proportion of from about 1 to about 5 moles of HF to each mole of acetylene and, preferably, should contain about 2 to 4 moles of HF per mole of acetylene. Larger proportions of HF have no advantage and involve the problems of recovering and recycling excessive amounts of HF reagent. Less than 1 mole of HF per mole of acetylene is operable, but results in a less efficient process. Temperatures materially below 200° C., result in uneconomically low conversions. Temperatures above 400° C. result in reduced conversions and in carbonization. Optimum conversions and yields are obtained at temperatures of from about 300° C. to about 350° C.

The mixture of HF and acetylene should be passed through the catalyst bed at a rate (calculated at standard temperature and pressure, i.e. 0° C. and 760 mm.) of from about 20 to about 200 volumes of acetylene per volume of catalyst per hour. Lower rates unduly reduce the capacity of the reactor and are uneconomical. Higher rates result in excessive amounts of unreacted acetylene in the effluent gases and render the process uneconomical due to the cost of separating and recovering acetylene. Preferably, the rate of flow of the mixture through the catalyst is from about 25 to about 125 volumes of acetylene per volume of catalyst per hour. Other conditions being equal, the lower velocities favor the formation of 1,1-difluoroethane as the main product and the higher velocities favor the formation of vinyl fluoride as the main product.

Preferably, the reaction is carried out at atmospheric pressure although superatmospheric pressures may also be used. The practical upper limit is about 15 atmospheres.

The acetylene should be purified before using it in this process. For example, it may be purified by passing it through water and sodium bisulfite solutions to remove any acetone or aldehyde impurities, through sodium hydroxide to remove any acidic impurities, then through a solution of sodium hydrosulfite containing a catalytic amount of beta-anthraquinone sodium sulfonate to remove oxygen, and finally through a drying column with calcium chloride. The acetylene, employed in the examples appearing below, was so purified.

The products of the reaction may be recovered in any conventional manner such as by condensing the product and fractionally distilling them to separate the components thereof. Any unreacted acetylene and HF may be returned to the reactor. Preferably, when operating on a small scale, the gases are passed through an alkali solution to remove excess HF, then dried over calcium chloride, then condensed and fractionally distilled in a Podbielniak still.

Where it is desired to obtain 1,1-difluoroethane with little or no vinyl fluoride, the vinyl fluoride may be recycled to the reactor with HF for further conversion to 1,1-difluoroethane. On the other hand, if it is desired to obtain only vinyl fluoride, the 1,1-difluoroethane may be recycled similarly. In the later case, it will be more desirable to pass the 1,1-difluoroethane through the catalyst, without HF or acetylene, at temperatures of from about 200° C. to about 400° C., preferably from about 300° C. to about 350° C., and at a rate of from about 20 to about 80 volumes per volume of catalyst per hour, preferably at a rate of from about 25 to about 35 volumes. Under such conditions, the 1,1-difluoroethane is dehydrofluorinated to produce high yields of vinyl fluoride. Catalysts of this invention, which have been used for the reaction of HF and acetylene and whose activity has been reduced to an extent such that they are no longer sufficiently efficient for practical use in such reaction, may be treated by passing air or oxygen over the heated catalyst, preferably heated to from about 600° C. to about 700° C., for 1 to 3 hours; whereby they are activated for use in the dehydrofluorination of the 1,1-difluoroethane to vinyl fluoride. Preferably, they will be so treated and used. This is an important advantage of the catalysts of this invention over mercury catalysts.

As indicated, the catalysts used in the process of this invention are chromium compounds, particularly chromium oxides and chromium salts of acids. For example, chromium trioxide ($CrO_3$), chromic oxide ($Cr_2O_3$), and beta-chromic oxide ($Cr_5O_9$), are effective chromic oxides. Chromium salts of inorganic acids and of organic acids, such as chromic acetate, chromic nitrate, chromic phosphate, chromic sulfate, chromic chloride, chromous chloride, chromic oxalate, chromous sulfate and the like, are also operable. A preferred catalyst is that obtained by heating a chromium fluoride hydrate, preferably $CrF_3 \cdot 3H_2O$, in a stream of nitrogen or gaseous anhydrous hydrogen fluoride or both until the water of hydration is removed, usually at a temperature of the order of 350° C. to 750° C. Analysis of the resulting catalyst indicates that it consists essentially of basic chromium fluorides, i.e. chromium oxyfluorides such as $CrF_2OH$ and $CrFO$, possibly mixed with small proportions of chromic oxide and/or chromium trifluoride. Complex chromium salts are also operable to catalyze the reaction between HF and acetylene, such, for example, as abieato chromic chloride, stearato chromic chloride and other Werner type complexes disclosed by Ralph K. Iler in U.S. Patent No. 2,356,161, patented August 22, 1944.

The catalysts are well-known compounds and can be prepared for use by known simple and conventional techniques. The salts and the oxides may be used directly as powder or pellets. Alternatively, the chromium compound may be deposited on an inert support. The chromium compound is impregnated onto carbon or other support such as, for example, barium sulfate, and the like, by evaporation of an aqueous solution or dispersion of the chromium compound mixed with the support. After evaporation, the material is dried. If desired, the supported catalyst can be treated with hydrogen. Hydrogen treatment is not essential, but it is preferred since catalysts so treated have been found to give somewhat better results. This is particularly true where chromium oxides are used. This treatment, which is probably a simple reduction, is carried out quite simply by merely passing hydrogen for 1 to 4 hours over the catalyst heated at about 400° C. The catalyst is ready for use immediately afterwards.

In order to more clearly illustrate this invention, preferred modes of carrying it into effect and advantageous results to be obtained thereby, the following examples are given in which the parts are by weight and the volumes and space velocities are calculated at standard temperature and pressure, i.e. 0° C. and 760 mm.

EXAMPLE 1

A catalyst was prepared by pouring a solution of 320 parts of chromium trioxide ($CrO_3$) in 300 parts of water over 343 parts of 6 x 12 mesh charcoal. The mass was evaporated while being agitated to insure uniform deposition and, when the aqueous phase was entirely removed, the supported catalyst was dried at 110° C. The catalyst was then reduced by passing hydrogen over it at 400° C. for approximately 2 hours. The catalyst was then used for the reaction between HF and acetylene.

The reactor for this reaction was a black iron pipe 1 inch in diameter and 33 inches long and placed in a vertical position in an electrical furnace 30 inches long. The bed of catalyst was supported on a stainless steel screen and covered by stainless steel wool. The bed was about 30 inches long and positioned in the heated portion of the reactor. The bed was heated to the desired temperature and a gaseous mixture of HF and acetylene was flowed upward through it while maintaining the temperature desired. The flow of the gaseous mixture into the bed was adjusted so the mole ratio of HF to acetylene was approximately 4:1. The space velocity of the acetylene was 112 volumes (calculated at 0° C. and 760 mm.) per volume of catalyst per hour. The exit gas was bubbled through 5% aqueous sodium hydroxide to absorb HF, then through a calcium chloride drying tower, and then condensed and the condensate cooled with solid carbon dioxide. The samples were analyzed by mass spectrograph in order to obtain the analytical data given below. Table 1 indicates the results obtained under the conditions stated:

Table 1

HF+ACETYLENE OVER CHROMIUM TRIOXIDE (Space velocity of acetylene=112 vol./vol. cat./hr.)

(4 to 1 mole ratio HF/acetylene)

| Temperatures | Percent VF [1] | Percent DFE [2] | Percent $C_2H_2$ |
|---|---|---|---|
| 200° C | 12.1 | 28.1 | 57.9 |
| 250° C | 27.2 | 21.0 | 50.3 |
| 300° C | 38.1 | 10.7 | 49.6 |
| 350° C | 46.2 | 5.5 | 43.3 |

[1] VF=vinyl fluoride.
[2] DFE=1,1-difluoroethane.

EXAMPLE 2

A horizontal reactor similar to that described in Example 1 was packed with a catalyst consisting of $CrO_3$ on charcoal and HF and acetylene passed through it at 350° C. The table which follows indicates the reaction conditions and the results obtained:

Table 2

HF+ACETYLENE OVER CHROMIUM TRIOXIDE

[Temp.=350°C. Catalyst=$CrO_3$ on charcoal.]

| | | |
|---|---|---|
| Space Velocity of Acetylene (Vol./Vol.Cat./hr.) | 138 | 98 |
| HF:$C_2H_2$ Molar Ratio | 2 | 5 |
| Percent VF | 39 | 28 |
| Percent DFE | 10 | 12 |
| Percent $C_2H_2$ | 46 | 57 |

EXAMPLE 3

A catalyst, consisting essentially of chromic oxide, was prepared by impregnating 68.5 parts of 6 x 12 mesh charcoal with 48 parts of $Cr_2O_3$ suspended in water, evaporating the aqueous phase and drying the supported catalyst as indicated in Example 1. This catalyst was not reduced. It was employed in the reactor described in Example 1. The conditions used and the results obtained are given in Table 3.

Table 3

HF+ACETYLENE OVER $Cr_2O_3$ CATALYST (HF: Acetylene=4:1) (Space velocity=112 vol./vol. cat./hr.)

| Temperature | Percent VF | Percent DFE | Percent $C_2H_2$ |
|---|---|---|---|
| 200° C | 1.0 | 4.0 | 95.0 |
| 250° C | 11.0 | 8.6 | 80.4 |
| 300° C | 12.0 | 3.5 | 84.5 |
| 350° C | 14.1 | 3.1 | 82.8 |

EXAMPLE 4

A catalyst, consisting of 70 parts of beta-chromic oxide ($Cr_5O_9$) particles of about 1/8" diameter, was placed in the reaction tube of Example 1 and was used as catalyst for the reaction between HF and acetylene at a mole ratio of 4:1. It was found that, at a temperature of 325° and a space velocity of 112, 13.2% of vinyl fluoride and 9.0% of 1,1-difluoroethane was obtained.

EXAMPLE 5

Pellets (260 cc.) of chromium trifluoride trihydrate ($CrF_3 \cdot 3H_2O$), containing 2% by weight of polytetrafluoroethylene as a binder, were charged into the reactor described in Example 1, and a gaseous mixture of anhydrous hydrogen fluoride and nitrogen was passed over the pellets heated to 350° C. until droplets of water stopped coming over and the catalyst was saturated with HF as judged by the presence of HF fumes in the exit gas, about one hour. A gaseous mixture of acetylene and anhydrous HF was passed over the resulting catalyst for about two hours in separate runs with the catalyst maintained at various temperatures. Table 4 indicates the results obtained under the stated conditions.

Table 4

HF+ACETYLENE OVER BASIC CHROMIUM FLUORIDE PELLETS (HF: Acetylene=4:1) (Space velocity=112 vol./vol. cat./hr.)

| Temperature | Percent VF | Percent DFE | Percent $C_2H_2$ |
|---|---|---|---|
| 200° C | 0.6 | 0.3 | 98.4 |
| 275° C | 1.6 | 1.6 | 96.0 |
| 355° C | 8.2 | 5.6 | 82.6 |

EXAMPLE 6

A catalyst was prepared by impregnating 68.5 parts of 4 x 10 mesh charcoal with 100 parts of a 33% solution of stearato chromic chloride in isopropanol and dried at 90° C. The catalyst was placed in the equipment of Example 1 and saturated with HF, after which the mixture of HF and acetylene was passed through. Table 5 indicates the results obtained under the stated conditions.

Table 5

HF+ACETYLENE OVER STEARATO CHROMIC CHLORIDE CATALYST (Space velocity=112) (HF: Acetylene=4:1)

| Temperature | Percent VF | Percent DFE | Percent $C_2H_2$ |
|---|---|---|---|
| 250° C | 5.1 | 3.5 | 90.7 |
| 325° C | 16.2 | 7.8 | 75.9 |

It will be understood that the preceding examples have been given for illustrative purposes solely, and that this invention is not limited to the specific embodiments therein. On the other hand, the catalysts, the proportions of reactants, the space velocities, the temperatures, and the other conditions may be varied as desired within the limits hereinbefore set forth in the general description without departing from the spirit or scope of this invention.

It will be apparent that this invention provides a novel process for producing vinyl chloride and 1,1-difluoroethane by means of catalysts which are novel for the reaction and which are effective therein and permit ready control of the process so as to produce either product in predominant amounts as desired. Furthermore, the catalysts are easy to prepare and are far less costly than catalysts which have been proposed previously, whereby this invention provides a process for preparing vinyl fluoride and 1,1-difluoroethane more easily and much more cheaply than heretofore. Also, the catalysts, when their activity for such reaction is seriously reduced, can be readily converted to useful and effective catalysts for the dehydrofluorination of polyfluoroalkanes, such as 1,1-difluoroethane and the like. Accordingly, it is apparent that this invention constitutes a valuable contribution to and advance in the art.

This is a continuation-in-part of my copending application Serial No. 484,816, filed January 28, 1955, now abandoned.

The embodiments of the invention in which an exclusive property or privilege is claimed are defined as follows:

1. The process for preparing a mixture of vinyl fluoride and 1,1-difluoroethane which comprises passing a gaseous mixture of HF and acetylene, containing from about 1 to about 5 moles of HF to each mole of acetylene, over a catalyst consisting essentially of at least one member of the group consisting of a chromium oxide and a chromium salt of an acid maintained at a temperature of from about 200° C. to about 400° C., the gaseous mixture being passed over the catalyst at a rate of from about 20 volumes to about 200 volumes of acetylene per volume of catalyst per hour, and recovering at least one of vinyl fluoride and 1,1-difluoroethane from the reaction mixture.

2. The process for preparing a mixture of vinyl fluoride and 1,1-difluoroethane which comprises passing a gaseous mixture of HF and acetylene, containing from about 2 to about 4 moles of HF to each mole of acetylene, over a catalyst consisting essentially of at least one member of the group consisting of a chromium oxide and a chromium salt of an acid maintained at a temperature of from about 200° C. to about 400° C., the gaseous mixture being passed over the catalyst at a rate of from about 20 volumes to about 200 volumes of acetylene per volume of catalyst per hour, and recovering at least one of vinyl fluoride and 1,1-difluoroethane from the reaction mixture.

3. The process for preparing a mixture of vinyl fluoride and 1,1-difluoroethane which comprises passing a gaseous mixture of HF and acetylene, containing from about 2 to about 4 moles of HF to each mole of acetylene, over a catalyst consisting essentially of at least one member of the group consisting of a chromium oxide and a chromium salt of an acid maintained at a temperature of from about 200° C. to about 400° C., the gaseous mixture being passed over the catalyst at a rate of from about 25 volumes to about 125 volumes of acetylene per volume of catalyst per hour, and recovering at least one of vinyl fluoride and 1,1-difluoroethane from the reaction mixture.

4. The process for preparing a mixture of vinyl fluoride and 1,1-difluoroethane which comprises passing a gaseous mixture of HF and acetylene, containing from about 2 to about 4 moles of HF to each mole of acetylene, over a catalyst consisting essentially of at least one member of the group consisting of a chromium oxide and a chromium salt of an acid maintained at a temperature of from about 300° C. to about 350° C., the gaseous mixture being passed over the catalyst at a rate of from about 25 volumes to about 125 volumes of acetylene per volume of catalyst per hour, and recovering at least one of vinyl fluoride and 1,1-difluoroethane from the reaction mixture.

5. The process for preparing a mixture of vinyl fluoride and 1,1-difluoroethane which comprises passing a gaseous mixture of HF and acetylene, containing from about 1 to about 5 moles of HF to each mole of acetylene, over a catalyst consisting essentially of a chromium salt of an acid maintained at a temperature of from about 200° C. to about 400° C., the gaseous mixture being passed over the catalyst at a rate of from about 20 volumes to about 200 volumes of acetylene per volume of catalyst per hour, and recovering at least one of vinyl fluoride and 1,1-difluoroethane from the reaction mixture.

6. The process for preparing a mixture of vinyl fluoride and 1,1-difluoroethane which comprises passing a gaseous mixture of HF and acetylene, containing from about 1 to about 5 moles of HF to each mole of acetylene, over a catalyst consisting essentially of a chromium salt of an inorganic acid maintained at a temperature of from about 200° C. to about 400° C., the gaseous mixture being passed over the catalyst at a rate of from about 20 volumes to about 200 volumes of acetylene per volume of catalyst per hour, and recovering at least one of vinyl fluoride and 1,1-difluoroethane from the reaction mixture.

7. The process for preparing a mixture of vinyl fluoride and 1,1-difluoroethane which comprises passing a gaseous mixture of HF and acetylene, containing from about 2 to about 4 moles of HF to each mole of acetylene, over a catalyst consisting essentially of a chromium salt of an inorganic acid maintained at a temperature of from about 300° C. to about 350° C., the gaseous mixture being passed over the catalyst at a rate of from about 25 volumes to about 125 volumes of acetylene per volume of catalyst per hour, and recovering at least one of vinyl fluoride and 1,1-difluoroethane from the reaction mixture.

8. The process for preparing a mixture of vinyl fluoride and 1,1-difluoroethane which comprises passing a gaseous mixture of HF and acetylene, containing from about 1 to about 5 moles of HF to each mole of acetylene, over a catalyst consisting essentially of basic chromium fluorides maintained at a temperature of from about 200° C. to about 400° C., the gaseous mixture being passed over the catalyst at a rate of from about 20 volumes to about 200 volumes of acetylene per volume of catalyst per hour, and recovering at least one of vinyl fluoride and 1,1-difluoroethane from the reaction mixture.

9. The process for preparing a mixture of vinyl fluoride and 1,1-difluoroethane which comprises passing a gaseous mixture of HF and acetylene, containing from about 2 to about 4 moles of HF to each mole of acetylene, over a catalyst consisting essentially of basic chromium fluorides maintained at a temperature of from about 300° C. to about 350° C., the gaseous mixture being passed over the catalyst at a rate of from about 25 volumes to about 125 volumes of acetylene per volume of catalyst per hour, and recovering at least one of vinyl fluoride and 1,1-difluoroethane from the reaction mixture.

10. The process for preparing a mixture of vinyl fluoride and 1,1-difluoroethane which comprises passing a gaseous mixture of HF and acetylene, containing from about 1 to about 5 moles of HF to each mole of acetylene, over a catalyst consisting essentially of stearato chromic chloride maintained at a temperature of from about 200° C. to about 400° C., the gaseous mixture being passed over the catalyst at a rate of from about 20 volumes to about 200 volumes of acetylene per volume of catalyst per hour, and recovering at least one of vinyl fluoride and 1,1-difluoroethane from the reaction mixture.

11. The process for preparing a mixture of vinyl fluoride and 1,1-difluoroethane which comprises passing a gaseous mixture of HF and acetylene, containing from about 2 to about 4 moles of HF to each mole of acetylene, over a catalyst consisting essentially of stearato chromic chloride maintained at a temperature of from about 300° C. to about 350° C., the gaseous mixture being passed over the catalyst at a rate of from about 25 volumes to about 125 volumes of acetylene per volume of catalyst per hour, and recovering at least one of vinyl fluoride and 1,1-difluoroethane from the reaction mixture.

12. The process for preparing a mixture of vinyl fluoride and 1,1-difluoroethane which comprises passing a gaseous mixture of HF and acetylene, containing from about 1 to about 5 moles of HF to each mole of acetylene, over a catalyst consisting essentially of a chromium oxide maintained at a temperature of from about 200° C. to about 400° C., the gaseous mixture being passed over the catalyst at a rate of from about 20 volumes to about 200 volumes of acetylene per volume of catalyst per hour, and recovering at least one of vinyl fluoride and 1,1-difluoroethane from the reaction mixture.

13. The process for preparing a mixture of vinyl fluoride and 1,1-difluoroethane which comprises passing a gaseous mixture of HF and acetylene, containing from about 2 to about 4 moles of HF to each mole of acetylene, over a catalyst consisting essentially of a chromium oxide maintained at a temperature of from about 300° C. to about 350° C., the gaseous mixture being passed over the catalyst at a rate of from about 25 volumes to about 125 volumes of acetylene per volume of catalyst per hour, and recovering at least one of vinyl fluoride and 1,1-difluorethane from the reaction mixture.

14. The process for preparing a mixture of vinyl fluoride and 1,1-difluoroethane which comprises passing a gaseous mixture of HF and acetylene, containing from about 1 to about 5 moles of HF to each mole of acetylene, (over a catalyst consisting essentially of reduced chromium trioxide maintained at a temperature of from about 200° C. to about 400° C., the gaseous mixture being passed over the catalyst at a rate of from about 20 volumes to about 200 volumes of acetylene per volume of catalyst per hour, and recovering at least one of vinyl fluoride and 1,1-difluoroethane from the reaction mixture.

15. The process for preparing a mixture of vinyl fluoride and 1,1-difluoroethane which comprises passing a gaseous mixture of HF and acetylene, containing from about 2 to about 4 moles of HF to each mole of acetylene, over a catalyst consisting essentially of reduced chromium trioxide maintained at a temperature of from about 300° C. to about 350° C., the gaseous mixture being passed over the catalyst at a rate of from about 25 volumes to about 125 volumes of acetylene per volume of catalyst per hour, and recovering at least one of vinyl fluoride and 1,1-difluoroethane from the reaction mixture.

References Cited in the file of this patent

UNITED STATES PATENTS

| | | |
|---|---|---|
| 2,110,369 | Leicester | Mar. 8, 1938 |
| 2,401,850 | Whitman | June 11, 1946 |
| 2,407,129 | Benning et al. | Sept. 3, 1946 |
| 2,461,523 | Coffman et al. | Feb. 15, 1949 |
| 2,519,199 | Salisbury | Aug. 15, 1950 |
| 2,716,142 | Skiles | Aug. 23, 1955 |
| 2,716,143 | Skiles | Aug. 23, 1955 |
| 2,745,886 | Ruh et al. | May 15, 1956 |